(12) United States Patent
Lin et al.

(10) Patent No.: US 11,838,706 B2
(45) Date of Patent: Dec. 5, 2023

(54) DIAPHRAGM COMPOSITE MATERIAL AND PREPARATION METHOD THEREOF

(71) Applicant: Zhejiang Pengyuan New Material Technology Group Co., Ltd., Zhejiang (CN)

(72) Inventors: Weiqiang Lin, Zhejiang (CN); Yong Gao, Zhejiang (CN); Hangli Zhu, Zhejiang (CN); Fujun Zheng, Zhejiang (CN)

(73) Assignee: Zhejiang Pengyuan New Material Technology Group Co., Ltd., Zhejiang (CN)

( * ) Notice: Subject to any disclaimer, the term of this patent is extended or adjusted under 35 U.S.C. 154(b) by 309 days.

(21) Appl. No.: 17/342,537

(22) Filed: Jun. 8, 2021

(65) Prior Publication Data

US 2022/0394376 A1 Dec. 8, 2022

(51) Int. Cl.
*H04R 31/00* (2006.01)
*H04R 1/28* (2006.01)
(Continued)

(52) U.S. Cl.
CPC ............ *H04R 31/003* (2013.01); *B32B 7/12* (2013.01); *B32B 27/065* (2013.01); *B32B 27/08* (2013.01); *B32B 27/36* (2013.01); *B32B 37/182* (2013.01); *H04R 1/2834* (2013.01); *B32B 2037/1253* (2013.01); *B32B 2250/03* (2013.01); *B32B 2255/10* (2013.01); *B32B 2255/205* (2013.01); *B32B 2266/126* (2016.11); *B32B 2307/212* (2013.01); *B32B 2309/02* (2013.01); *B32B 2309/04* (2013.01); *B32B 2309/12* (2013.01); *B32B 2311/24* (2013.01); *B32B 2323/04* (2013.01); *B32B 2457/00* (2013.01)

(58) Field of Classification Search
CPC ............ H04R 31/003; H04R 2307/025; H04R 2307/027; H04R 7/02; H04R 7/10; B32B 37/182; B32B 2037/1253; B32B 2266/126; B32B 2309/02; B32B 2309/04; B32B 2309/12; B32B 2311/24; B32B 2323/04
See application file for complete search history.

(56) References Cited

FOREIGN PATENT DOCUMENTS

| CN | 202873041 | 4/2013 |
| CN | 106003668 | 10/2016 |

(Continued)

*Primary Examiner* — John L Goff, II
(74) *Attorney, Agent, or Firm* — COOPER LEGAL GROUP, LLC

(57) ABSTRACT

The present application relates to the technical field of composite film, and more particularly, to a diaphragm composite material and a preparation method thereof. The diaphragm composite material includes a polyethylene naphthalate (PEN) film layer, an aluminum-plated film layer, an aerogel layer, and an elastic adhesive layer disposed between the PEN film layer and the aluminum-plated film layer for bonding the PEN film layer and the aluminum-plated film layer, the aerogel layer is coated on one side of the aluminum-plated film layer away from the elastic adhesive layer. The diaphragm composite layer of the present application has high strength and strong rigidity, has better vibration dampening and noise-reducing effects, and wear-resistant and corrosion-resistant effects, and is worthy of popularization.

4 Claims, 1 Drawing Sheet

(51) Int. Cl.
    *B32B 7/12*         (2006.01)
    *B32B 27/36*      (2006.01)
    *B32B 27/08*      (2006.01)
    *B32B 27/06*      (2006.01)
    *B32B 37/18*      (2006.01)
    B32B 37/12      (2006.01)

(56) References Cited

FOREIGN PATENT DOCUMENTS

| | | | |
|---|---|---|---|
| CN | 206302564 | 7/2017 | |
| CN | 108839408 A | * 11/2018 | ............. B32B 15/04 |
| CN | 111267411 | 6/2020 | |
| JP | 5326369 B2 | * 10/2013 | |

* cited by examiner

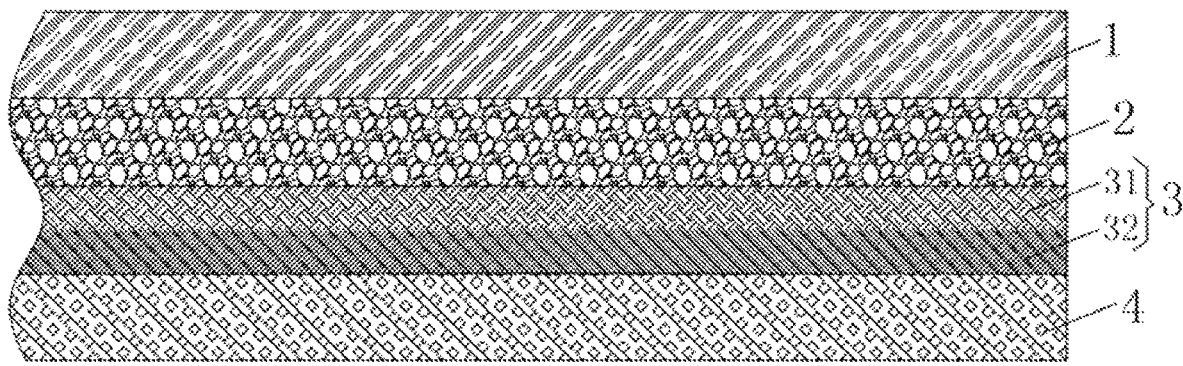

DIAPHRAGM COMPOSITE MATERIAL AND PREPARATION METHOD THEREOF

BACKGROUND

Technical Field

The present application relates to the technical field of composite film, and more particularly, to a diaphragm composite material and a preparation method thereof.

Description of Related Art

A loudspeaker is an important acoustic component in an electronic device, and is a sound amplification device that converts a sound wave signal into an acoustic signal and transmits the acoustic signal. The loudspeaker generally includes a vibrating system and a magnetic circuit system, the vibrating system includes a diaphragm and a voice coil combined together. The diaphragm is one of important components of the loudspeaker, and plays a crucial role in the sound amplification performance of the loudspeaker, and determines the quality of the conversion of the loudspeaker from electrical energy to acoustic energy.

The diaphragm available on the market is usually a composite material made of a common polyurethane (TPU) thermoplastic elastomer, engineering plastics and an adhesive film. Such a diaphragm is poor in performance and effect: performance and effect of such a diaphragm are poor: the generated noise is large, the damping performance and the electromagnetic shielding performance are weak, and interference is easy to generate during work. With the continuous development of acoustic product market demands, users put higher requirements on the acoustic performance and reliability of the loudspeaker.

The utility model patent with the publication No. CN206302564U discloses a diaphragm composite layer for a sound producing device and a sound producing device, which include a metal layer, an aerogel layer and a polyester film layer, the metal layer acts as the top layer of the diaphragm composite layer, the polyester film layer acts as the bottom layer of the diaphragm composite layer, the aerogel layer is an intermediate layer sandwiched between the metal layer and the polyester film layer, the diaphragm composite layer is configured to be attached to the diaphragm of the sound producing device. In this technology, although the weight of the diaphragm composite layer is reduced to a certain extent by arranging the aerogel layer, the diaphragm composite layer cannot be well protected due to the fact that the aerogel layer is arranged between the metal layer and the polyester film layer, the outer surface layer of the aerogel layer is prone to being damaged or oxidized, resulting in degraded quality and shortened service life of the diaphragm composite layer.

The utility model patent with the publication No. CN202873041U discloses a composite diaphragm, which includes a polyetheretherketone film, and a thermoplastic polyurethane elastomer attached to the surface of the polyetheretherketone film. The thermoplastic polyurethane elastomer is added to the polyetheretherketone film, and the composite diaphragm has good stability to changes in the environment, effectively reduces the resonant frequency of the product, widens the frequency band, improves the power resistance capability of the loudspeaker, and has simple process and low production cost. However, the composite diaphragm is formed by compounding layers, has poor damping performance and cannot satisfy the application of speakers in the low-frequency field.

The invention patent No. CN106003668A discloses a silica gel diaphragm and a preparation method thereof, the molded silica gel diaphragm is continuously introduced into a mold cavity of a molding press, and kept flat in the mold cavity; mold closing is performed, mold temperature is controlled, the pressure of the molding press is adjusted and maintained for a period of time; a required silica gel diaphragm is prepared; the process of the silica gel diaphragm is simple, molding is convenient, large-scale preparation can be realized. However, the silica gel diaphragm is only formed by vertically or horizontally closing the silica gel diaphragm, since the silica gel diaphragm is made of a single material, the damping performance of the silica gel diaphragm is insufficient, when the silica gel diaphragm is applied to the loudspeaker, the loudspeaker is slightly flawed at a low frequency, and is insufficient in behavior; it is difficult to satisfy people's requirements for a high-quality electronic device.

SUMMARY

In view of the above-mentioned technical problems in the background, and the present application provides a diaphragm composite material and a preparation method thereof.

In one aspect, the present application provides the following technical solutions: a diaphragm composite material, including a polyethylene naphthalate (PEN) film layer, an aluminum-plated film layer, an aerogel layer, and an elastic adhesive layer disposed between the PEN film layer and the aluminum-plated film layer for bonding the PEN film layer and the aluminum-plated film layer. The aerogel layer is coated on one side of the aluminum-plated film layer away from the elastic adhesive layer.

Preferably, the aluminum-plated film layer includes a polyethylene terephthalate (PET) film and a metal aluminum layer evaporated on the surface of the PET film.

Preferably, the PEN film layer is mainly made by mixing polyethylene naphthalate, nylon 6 and fibrous filler.

Preferably, the fibrous filler is one or more selected from the group consisting of glass fiber, ceramic fiber and carbon fiber.

Preferably, the elastic adhesive layer is mainly made of polyacrylate elastomer or polyurethane elastomer.

Preferably, the aerogel layer is mainly prepared from a silicon oxide-silicon nitride composite aerogel or a silicon dioxide-phenolic resin composite aerogel.

In another aspect, the present application further provides a method for preparing a diaphragm composite material, including the following steps of.

Step S1: preparing a PEN film layer, and the preparing step particularly includes:

step S1.1: weighing materials including the following components in parts by mass: 70-80 parts of polyethylene naphthalate (PEN), 10-15 parts of nylon 6, 10-15 parts of fibrous filler, 1-2 parts of silane coupling agent and 0.5-1 parts of lubricant; and adding the weighed materials to a mixer for mixing and stirring to form a mixture;

step S1.2: adding ethanol to the mixture and stirring, and then adding the mixture to an extruder, melt-blending, and granulating by extrusion; the mass ratio of the ethanol to the mixture is 1:(4-6);

step S1.3: drying particles extruded in step S1.2 and then adding the dried particles to an injection molding machine for injection molding to obtain a long-chain branched PEN film layer.

Step S2: preparing of an aerogel layer material, particularly including: adding the following materials in parts by mass to a high-speed micro-powder stirrer: 20-30 parts of propylene oxide, 80-130 parts of acetic acid, 50-70 parts of polyethylene glycol 600, and 10-30 parts of formamide, stirring for 5-10 min to provide a solution, and adjusting the temperature of the solution to 5-8° C., and then adding 5-20 parts of silicon oxide-silicon nitride composite aerogel, 20-30 parts of toluene diisocyanate trimer, and 10-15 parts of isophorone diisocyanate trimer, and continuing stirring for 5-10 min; and then performing air classification, and collecting powder passing through a 8000-mesh filter screen to provide the aerogel layer material, in which the rotating speed of the high-speed micro-powder stirrer is 800-1000 r/min.

Step S3: delivering the aerogel layer material powder collected in step S2 by compressed air, filtering and drying, and then entering 800-1000° C. high-temperature vaporizing chamber, forming an ultrasonic airflow through a nozzle to inject into a surface at a side of an aluminum-plated film layer where aluminum is plated, and continuously irradiating the surface of the side with a high-speed plasma beam to form the aluminum-plated film layer with an aerogel layer attached to one side.

Step S4: uniformly coating the surface of the PEN film layer with an elastic adhesive, and then bonding and pressing the surface of the aluminum-plated film layer at one side where the aerogel layer is not attached, the bonding roll having a temperature of 60-80° C., and a pressure of 120-160 MPa, and then curing at 35-50° C. for 60-75 h after completion of bonding, to obtain a diaphragm composite material.

Preferably, in step S3, the plasma beam voltage is 1200-1450 KV, and the irradiation time is 2-5 s.

Preferably, the preparing step of the silicon oxide-silicon nitride composite aerogel in step S2 particularly includes:
  step 1) the following materials are calculated in parts by mass, fully mixing and uniformly stirring 1 part of tetraethoxysilane (TEOS), 2.5-4 parts of anhydrous ethanol and 2.5-4 parts of water, adjusting the pH value to 4 through diluted hydrochloric acid, and reacting to form sol A;
  step 2) adjusting the pH value of sol A to 7 through ammonia water, adding 1-1.5 parts by mass of silicon nitride by stirring, and standing at room temperature to form gel B;
  step 3) aging gel B at room temperature for 24 h, then immersing gel B in anhydrous ethanol at room temperature, and continuing aging for 48 h;
  step 4) soaking the aged gel B in a n-hexane solution containing 10% of trimethylsilane for 6 h, and performing hydrophobization treatment;
  step 5) drying the gel B treated in the step S2.4 at 80-100° C. under normal pressure;
  treating the dried gel B in a muffle furnace at 450-500° C. for 4-6 h, and crushing to obtain the silicon oxide-silicon nitride composite aerogel.

Preferably, the silicon nitride in step 2) has an average particle size of 30-50 nm.

Preferably, the trimethylsilane in step 4) also can be trimethylchlorosilane, long-chain segment methylsilane or methylfluorosilane.

Preferably, the silane coupling agent in step S1 is KH-550, KH-560 or KH-570.

The beneficial effects of the present application are that: the diaphragm composite layer is high in strength and strong in rigidity, has better vibration dampening and noise-reducing effects; the PEN film layer is arranged to increase the plasticity of the diaphragm composite layer, and improve the heat resistance; the elastic adhesive is arranged to bond the PEN film layer and the aluminum-plated film layer, greatly increasing the toughness of the diaphragm composite layer; the aluminum-plated film layer is arranged to increase the damping performance and electromagnetic shielding performance of the diaphragm composite layer, and meanwhile, make the aluminum-plated film layer have better heat resistance and higher strength; the aerogel is arranged to protect the aluminum-plated film layer, so that the aluminum-plated film layer is more wear-resistant and corrosion-resistant.

BRIEF DESCRIPTION OF THE DRAWINGS

FIG. 1 is a schematic diagram of an overall structure of a diaphragm composite material in the present application.

DESCRIPTION OF THE EMBODIMENTS

The present application will now be described in details in conjunction with the specific embodiments.

One embodiment provides a diaphragm composite material, including a polyethylene naphthalate (PEN) film layer 1, an aluminum-plated film layer 3, an aerogel layer 4, and an elastic adhesive layer 2 disposed between the PEN film layer 1 and the aluminum-plated film layer 3 for bonding the PEN film layer 1 and the aluminum-plated film layer 3. The elastic adhesive layer 2 is made of a thermoplastic elastomer. Specifically, the elastic adhesive layer 2 is mainly made of polyacrylate elastomer or polyurethane elastomer. The thickness of the elastic adhesive layer 2 is 12-65 μm. The arrangement of the elastic adhesive layer 2 not only well bonds the PEN film layer 1 and the aluminum plated film layer 3, but also enables the material to have certain toughness, thereby improving durability of the product. The aluminum-plated film layer 3 includes a polyethylene terephthalate (PET) film 31 and a metal aluminum layer 32 evaporated on the surface of the PET film 31. The metal aluminum layer 32 is arranged to improve the damping performance and the electromagnetic shielding performance of the diaphragm composite layer, while the PET film 31 is arranged to increase the strength of the composite film, and improve the heat resistance. The PEN film layer 1 provides a substrate material for the diaphragm composite layer, increases the overall rigidity strength of the diaphragm composite layer, and improves the heat resistance and plasticity thereof. The aerogel layer 4 is coated on one side of the aluminum-plated film layer 3 away from the elastic adhesive layer 2. The aerogel layer 4 is arranged to protect the aluminum-plated film layer, and improve the wear resistance and the corrosion resistance of the aluminized film layer.

In this embodiment, the PEN film layer 1 is mainly made by mixing polyester PEN, nylon 6 and fibrous filler.

In this embodiment, the fibrous filler is one or more selected from the group consisting of glass fiber, ceramic fiber and carbon fiber.

In this embodiment, the aerogel layer is mainly prepared from a silicon oxide-silicon nitride composite aerogel or a silicon dioxide-phenolic resin composite aerogel, making the diaphragm composite layer have better wear resistance and corrosion resistance, and making it more durable.

Another embodiment provides a method for preparing a diaphragm composite material, including the following steps of:

Step S1: preparing a PEN film layer, and the preparing step particularly includes:
- step S1.1: drying materials PEN (i.e., polyethylene naphthalate) at 100-130° C. for 2.5-4 h; then weighing materials including the following components in parts by mass: 70-80 parts of PEN, 10-15 parts of nylon 6, 10-15 parts of fibrous filler, 1-2 parts of silane coupling agent and 0.5-1 parts of lubricant; and adding the weighed materials to a mixer for mixing and stirring to form a mixture;
- step S1.2: adding ethanol to the mixture and stirring, and then adding the mixture to an extruder, melt-blending, and granulating by extrusion; the mass ratio of the ethanol to the mixture is 1:(4-6);
- step S1.3: drying particles extruded in step S1.2 and then adding the dried particles to an injection molding machine for injection molding to obtain a long-chain branched PEN film layer.

In particular, the silane coupling agent can be KH-550, KH-560 or KH-570.

Particularly, in step S1.2, the extruder is a double-screw extruder, the rotating speed of the screws is 40-60 rpm, and the temperature from the extruder hopper to the die zone is 240-260° C.

Particularly, in step S1.3, the temperature of the nozzle of the injection molding machine is 250-270° C., and the injection pressure is 65-75 MPa.

Step S2: preparing of an aerogel layer material, particularly including: adding the following materials to a high-speed micro-powder stirrer in parts by mass: 20-30 parts of propylene oxide, 80-130 parts of acetic acid, 50-70 parts of polyethylene glycol 600, and 10-30 parts of formamide, stirring for 5-10 min to provide a solution, and adjusting the temperature of the solution to 5-8° C., and then adding 5-20 parts of silicon oxide-silicon nitride composite aerogel, 20-30 parts of toluene diisocyanate trimer, and 10-15 parts of isophorone diisocyanate trimer, and continuing stirring for 5-10 min; and then performing air classification, and collecting powder passing through a 8000-mesh filter screen to provide the aerogel layer material, in which the rotating speed of the high-speed micro-powder stirrer is 800-1000 r/min.

Step S3: delivering the aerogel layer material powder collected in step S2 by compressed air, filtering and drying, and then entering 800-1000° C. high-temperature vaporizing chamber, forming an ultrasonic airflow through a nozzle to inject into a surface at a side of an aluminum-plated film layer where aluminum is plated, and continuously irradiating the surface of the side with a high-speed plasma beam to form the aluminum-plated film layer with an aerogel layer attached to one side.

Step S4: uniformly coating the surface of the PEN film layer with an elastic adhesive, and then bonding and pressing the surface of the aluminum-plated film layer at one side where the aerogel layer is not attached, the bonding roll having a temperature of 60-80° C., and a pressure of 120-160 MPa, and then curing at 35-50° C. for 60-75 h after completion of bonding, to obtain a diaphragm composite material.

In particular, the aluminum-plated film layer is prepared as follows: the PET film is used as a substrate, the metal aluminum is directly evaporated on the surface of the substrate through a vacuum film coating machine. Thus, a metal aluminum layer is formed on the surface of the PET film, thereby obtaining an aluminum plating layer. The metal aluminum here is not evaporated on the two sides of the PET film, but only evaporated to the surface of one side of the PET film. Therefore, on one hand, the metal aluminum layer can provide a certain damping performance and electromagnetic shielding performance for the diaphragm composite layer, on the other hand, the arrangement of the single-sided metal aluminum layer can also save processes and consumables. Moreover, by arranging the PET film, the strength and the heat resistance of the diaphragm composite layer can be enhanced.

In this embodiment, in step S3, the plasma beam voltage is 1200-1450 KV, and the irradiation time is 2-5 s.

In this embodiment, the preparing step of the silicon oxide-silicon nitride composite aerogel in step S2 particularly comprises:
- step 1) the following materials are calculated in parts by mass, fully mixing and uniformly stirring 1 part of TEOS, 2.5-4 parts of anhydrous ethanol and 2.5-4 parts of water, adjusting the pH value to 4 through diluted hydrochloric acid, and reacting to form sol A;
- step 2) adjusting the pH value of sol A to 7 through ammonia water, adding 1-1.5 parts by mass of silicon nitride by stirring, and standing at room temperature to form gel B; particularly, the silicon nitride has an average particle size of 30-50 nm;
- step 3) aging gel B at room temperature for 24 h, then immersing gel B in anhydrous ethanol at room temperature, and continuing aging for 48 h;
- step 4) soaking the aged gel B in a n-hexane solution containing 10% of trimethylsilane for 6 h, and performing hydrophobization treatment, to make the surface more resistant to corrosion;
- in particular, the n-hexane solution also can be a n-hexane solution containing 10% of trimethylsilane, a n-hexane solution containing 10% of long-chain segment methylsilane, or a n-hexane solution containing 10% of methylfluorosilane;
- step 5) drying the gel B treated in the step S2.4 at 80-100° C. under normal pressure; treating the dried gel B in a muffle furnace at 450-500° C. for 4-6 h, and crushing to obtain the silicon oxide-silicon nitride composite aerogel.

Embodiment 1

A diaphragm composite material, including a PEN film layer 1, an aluminum-plated film layer 3, an aerogel layer 4, and an elastic adhesive layer 2 disposed between the PEN film layer 1 and the aluminum-plated film layer 3 for bonding the PEN film layer 1 and the aluminum-plated film layer 3. The elastic adhesive layer 2 is made of a thermoplastic elastomer. Specifically, the elastic adhesive layer 2 is mainly made of polyacrylate elastomer or polyurethane elastomer. The thickness of the elastic adhesive layer 2 is 12-65 μm. The arrangement of the elastic adhesive layer 2 not only well bonds the PEN film layer 1 and the aluminum plated film layer 3, but also enables the material to have certain toughness, thereby improving durability of the product. The aluminum-plated film layer 3 includes a PET film 31 and a metal aluminum layer 32 evaporated on the surface of the PET film 31. The metal aluminum layer 32 is arranged to improve the damping performance and the electromagnetic shielding performance of the diaphragm composite layer, while the PET film 31 is arranged to increase the strength of the composite film, and improve the heat resistance. The PEN film layer 1 provides a substrate material for the diaphragm composite layer, increases the overall rigidity strength of the diaphragm composite layer, and improves the heat resistance and plasticity thereof. The aerogel layer 4 is coated on one side of the aluminum-plated film layer 3 away from the elastic adhesive layer 2. The aerogel layer 4 is arranged to protect the aluminum-plated film layer, and improve the wear resistance and the corrosion resistance of the aluminized film layer.

In this embodiment, the PEN film layer 1 is mainly made by mixing polyester PEN, nylon 6 and fibrous filler.

In this embodiment, the fibrous filler is one or more selected from the group consisting of glass fiber, ceramic fiber and carbon fiber.

In this embodiment, the aerogel layer is mainly prepared from a silicon oxide-silicon nitride composite aerogel or a silicon dioxide-phenolic resin composite aerogel, making the diaphragm composite layer have better wear resistance and corrosion resistance, and making it more durable.

Another embodiment provides a method for preparing a diaphragm composite material, including the following steps of.

Step S1: preparing a PEN film layer, including:
step S1.1: drying materials PEN (i.e., polyethylene naphthalate) at 100° C. for 2.5 h; then weighing materials including the following components in parts by mass: 70 parts of PEN, 10 parts of nylon 6, 10 parts of fibrous filler, 1 part of silane coupling agent and 0.5 parts of lubricant; and adding the weighed materials to a mixer for mixing and stirring to form a mixture;
step S1.2: adding ethanol to the mixture under stirring, and then adding the mixture to an extrude, melt-blending, and granulating by extrusion, in which the mass ratio of the ethanol to the mixture is 1:4;
step S1.3: drying particles extruded in step S1.2 and then adding the dried particles to an injection molding machine for injection molding to obtain a long-chain branched PEN film layer.

In particular, the silane coupling agent can be KH-550, KH-560 or KH-570.

Particularly, in step S1.2, the extruder is a double-screw extruder, the rotating speed of the screws is 40 rpm, and the temperature from the extruder hopper to the die zone is 240° C.

Particularly, in step S1.3, the temperature of the nozzle of the injection molding machine is 250° C., and the injection pressure is 65 MPa.

Step S2: preparing of an aerogel layer material, including: adding the following materials in parts by mass to a high-speed micro-powder stirrer: 20 parts of propylene oxide, 80 parts of acetic acid, 50 parts of polyethylene glycol 600, and 10 parts of formamide, stirring for 5 min to provide a solution, and adjusting the temperature of the solution to 5° C.; then adding 5 parts of silicon oxide-silicon nitride composite aerogel, 20 parts of toluene diisocyanate trimer, and 10 parts of isophorone diisocyanate trimer, and continuing stirring for 5 min; and then performing air classification, and collecting powder passing through a 8000-mesh filter screen to provide the aerogel layer material, in which the rotating speed of the high-speed micro-powder stirrer is 800 r/min.

Step S3: delivering the aerogel layer material powder collected in step S2 by compressed air, filtering and drying, and then entering 800° C. high-temperature vaporizing chamber, forming an ultrasonic airflow through a nozzle to inject into a surface at a side of the aluminum-plated film layer where aluminum is plated, and continuously irradiating the surface of the side with a high-speed plasma beam to form an aluminum-plated film layer with an aerogel layer attached to one side.

S4: uniformly coating a surface of the PEN film layer with an elastic adhesive, and then bonding and pressing the surface of the aluminum-plated film layer at one side where the aerogel layer is not attached, the bonding roll having a temperature of 80° C., and a pressure of 120 MPa, and then curing at 50° C. for 60 h after completion of bonding, to obtain a diaphragm composite material.

In particular, the aluminum-plated film layer is prepared as follows: the PET film is used as a substrate, the metal aluminum is directly evaporated on the surface of the substrate through a vacuum film coating machine. Thus, a metal aluminum layer is formed on the surface of the PET film, thereby obtaining an aluminum plating layer. The metal aluminum here is not evaporated on the two sides of the PET film, but only evaporated to the surface of one side of the PET film. Therefore, on one hand, the metal aluminum layer can provide a certain damping performance and electromagnetic shielding performance for the diaphragm composite layer, on the other hand, the arrangement of the single-sided metal aluminum layer can also save processes and consumables. Moreover, by arranging the PET film, the strength and the heat resistance of the diaphragm composite layer can be enhanced.

In this embodiment, in step S3, the plasma beam voltage is 1450 KV, and the irradiation time is 3 s.

In this embodiment, the preparing step of the silicon oxide-silicon nitride composite aerogel in step S2 particularly comprises:
step 1) the following materials are calculated in parts by mass, fully mixing and uniformly stirring 1 part of TEOS, 4 parts of anhydrous ethanol and 4 parts of water, adjusting the pH value to 4 (within an allowable error range) through diluted hydrochloric acid, and reacting to form sol A;
step 2) adjusting the pH value of sol A to 7 through ammonia water, adding 1-1.5 parts by mass of silicon nitride by stirring, and standing at room temperature to form gel B; particularly, the silicon nitride has an average particle size of 50 nm;
step 3) aging gel B at room temperature for 24 h, then immersing gel B in anhydrous ethanol at room temperature, and continuing aging for 48 h;
step 4) soaking the aged gel B in a n-hexane solution containing 10% of trimethylsilane for 6 h, and performing hydrophobization treatment, to make the surface more resistant to corrosion;
in particular, the n-hexane solution also can be a n-hexane solution containing 10% of trimethylsilane, a n-hexane solution containing 10% of long-chain segment methylsilane, or a n-hexane solution containing 10% of methylfluorosilane;
step 5) drying the gel B treated in the step S2.4 at 80° C. under normal pressure; treating the dried gel B in a muffle furnace at 500° C. for 4 h, and crushing to obtain the silicon oxide-silicon nitride composite aerogel.

Embodiment 2

This embodiment is essentially the same as Embodiment 1 except that, this embodiment provides a method for preparing a diaphragm composite material, including the following steps of.

Step S1: preparing a PEN film layer, particularly including:

step S1.1: drying materials PEN (i.e., polyethylene naphthalate) at 130° C. for 4 h; then weighing materials including the following components in parts by mass: 80 parts of PEN, 15 parts of nylon 6, 15 parts of fibrous filler, 2 parts of silane coupling agent and 1 parts of lubricant; and adding the weighed materials to a mixer for mixing and stirring to form a mixture;

step S1.2: adding ethanol to the mixture and stirring, and then adding the mixture to an extruder, melt-blending, and granulating by extrusion in which the mass ratio of the ethanol to the mixture is 1:6;

step S1.3: drying particles extruded in step S1.2 and then adding the dried particles to an injection molding machine for injection molding to obtain a long-chain branched PEN film layer.

In particular, the silane coupling agent can be KH-550, KH-560 or KH-570;

Particularly, in step S1.2, the extruder is a double-screw extruder, the rotating speed of the screws is 60 rpm, and the temperature from the extruder hopper to the die zone is 260° C.

Particularly, in step S1.3, the temperature of the nozzle of the injection molding machine is 270° C., and the injection pressure is 75 MPa.

Step S2: preparing of an aerogel layer material, particularly including: adding the following materials in parts by mass to a high-speed micro-powder stirrer: 30 parts of propylene oxide, 130 parts of acetic acid, 70 parts of polyethylene glycol 600, and 30 parts of formamide, stirring for 10 min to provide a solution, and adjusting the temperature of the solution to 8° C., and then adding 20 parts of silicon oxide-silicon nitride composite aerogel, 30 parts of toluene diisocyanate trimer, and 15 parts of isophorone diisocyanate trimer, and continuing stirring for 10 min; and then performing air classification, and collecting powder passing through a 8000-mesh filter screen to provide the aerogel layer material, in which the rotating speed of the high-speed micro-powder stirrer is 1000 r/min.

Step S3: delivering the aerogel layer material powder collected in step S2 by compressed air, filtering and drying, and then entering 1000° C. high-temperature vaporizing chamber, forming an ultrasonic airflow through a nozzle to inject into a surface at a side of the aluminum-plated film layer where aluminum is plated, and continuously irradiating the surface of the side with a high-speed plasma beam to form an aluminum-plated film layer with an aerogel layer attached to one side.

Step S4: uniformly coating the surface of the PEN film layer with an elastic adhesive, and then bonding and pressing the surface of the aluminum-plated film layer at one side where the aerogel layer is not attached, the bonding roll having a temperature of 60° C., and a pressure of 160 MPa, and then curing at 35° C. for 75 h after completion of bonding, to obtain a diaphragm composite material.

In particular, the aluminum-plated film layer is prepared as follows: the PET film is used as a substrate, and the metal aluminum is directly evaporated on the surface of the substrate through a vacuum film coating machine. Thus, a metal aluminum layer is formed on the surface of the PET film, thereby obtaining an aluminum plating layer. The metal aluminum here is not evaporated on the two sides of the PET film, but only evaporated to the surface of one side of the PET film. Therefore, on one hand, the metal aluminum layer can provide a certain damping performance and electromagnetic shielding performance for the diaphragm composite layer, on the other hand, the arrangement of the single-sided metal aluminum layer can also save processes and consumables. Moreover, by arranging the PET film, the strength and the heat resistance of the diaphragm composite layer can be enhanced.

In this embodiment, in step S3, the plasma beam voltage is 1200 KV, and the irradiation time is 5 s.

In this embodiment, the preparing step of the silicon oxide-silicon nitride composite aerogel in step S2 particularly includes:

step 1) fully mixing the following materials in parts by mass: 1 part of TEOS, 2.5 parts of anhydrous ethanol and 2.5 parts of water under stirring, adjusting the pH value to 4 (within an allowable error range) through diluted hydrochloric acid, and reacting to form sol A;

step 2) adjusting the pH value of sol A to 7 (within an allowable error range) through ammonia water, adding 1 part by mass of silicon nitride under stirring, and standing at room temperature to form gel B in which the silicon nitride has an average particle size of 30 nm;

step 3) aging gel B at room temperature for 24 h, then immersing gel B in anhydrous ethanol at room temperature, and continuing aging for 48 h;

step 4) soaking the aged gel B in a n-hexane solution containing 10% of trimethylsilane for 6 h, and performing hydrophobization treatment, rendering the surface more resistant to corrosion;

in particular, the n-hexane solution also can be a n-hexane solution containing 10% of trimethylsilane, a n-hexane solution containing 10% of long-chain segment methylsilane, or a n-hexane solution containing 10% of methylfluorosilane;

step 5) drying the gel B treated in the step S2.4 at 100° C. under normal pressure; treating the dried gel B in a muffle furnace at 450° C. for 6 h, and crushing to obtain the silicon oxide-silicon nitride composite aerogel.

The above embodiments are only for illustrating the present application and are not intended to limit the present application, and those skilled in the art can make various changes and modifications without departing from the spirit and scope of the present application. Therefore, all equivalent technical solutions also belong to the protection scope of the present application as set forth in the claims.

What is claimed is:

1. A method for preparing a diaphragm composite material, comprising the following steps of:
   step S1: preparing a polyethylene naphthalate film layer, comprising:
      step S1.1: weighing materials comprising the following components in parts by mass: 70-80 parts of polyethylene naphthalate, 10-15 parts of nylon 6, 10-15 parts of fibrous filler, 1-2 parts of silane coupling agent and 0.5-1 parts of lubricant; and adding the weighed materials to a mixer for mixing under stirring to form a mixture;
      step S1.2: adding ethanol to the mixture under stirring, then adding the mixture to an extruder, melt-blending, and granulating by extrusion; wherein a mass ratio of the ethanol to the mixture is 1: (4-6); and
      step S1.3: drying particles extruded in the step S1.2 and then adding the dried particles to an injection molding machine for injection molding to obtain a long-chain branched polyethylene naphthalate film layer;
   step S2: preparing an aerogel layer material, comprising: adding the following materials in parts by mass to a micro-powder stirrer: 20-30 parts of propylene oxide, 80-130 parts of acetic acid, 50-70 parts of polyethylene glycol 600, and 10-30 parts of formamide, stirring for 5-10 min to provide a solution, and adjusting a temperature of the solution to 5-8° C.; then adding 5-20 parts of silicon oxide-silicon nitride composite aerogel, 20-30 parts of toluene diisocyanate trimer, and 10-15 parts of isophorone diisocyanate trimer, and continuing stirring for 5-10 min; and then performing air classification and collecting aerogel layer material powder passing through a 8000-mesh filter screen to provide the aerogel layer material; wherein a rotating speed of the micro-powder stirrer is 800-1000 r/min;

step S3: delivering the aerogel layer material powder collected in the step S2 by compressed air, filtering and drying, and then entering a 800-1000° C. high-temperature vaporizing chamber, forming an ultrasonic airflow through a nozzle to inject into a surface of a side of an aluminum-plated film layer where aluminum is plated, and continuously irradiating the surface of the side with a plasma beam to form the aluminum-plated film layer with an aerogel layer attached to one side; and step S4: uniformly coating a surface of the polyethylene naphthalate film layer with an elastic adhesive, and then bonding and pressing the surface of the aluminum-plated film layer at one side where the aerogel layer is not attached, the bonding having a temperature of 60-80° C., and a pressure of 120-160 MPa, and then curing at 35-50° C. for 60-75 h after completion of the bonding, to obtain the diaphragm composite material.

2. The method for preparing the diaphragm composite material according to claim 1, wherein in the step S3, a plasma beam voltage of the plasma beam is 1200-1450 kV, and an irradiation time is 2-5 s.

3. The method for preparing the diaphragm composite material according to claim 1, wherein preparing the silicon oxide-silicon nitride composite aerogel in the step S2 comprises:

step S2.1: fully mixing the following materials in parts by mass: 1 part of tetraethoxysilane, 2.5-4 parts of anhydrous ethanol and 2.5-4 parts of water under stirring, adjusting a pH value to 4 through diluted hydrochloric acid, and reacting to form a sol A;

step S2.2: adjusting the pH value of the sol A to 7 through ammonia water, adding 1-1.5 parts by mass of silicon nitride under stirring, and standing at room temperature to form a gel B;

step S2.3: aging the gel B at room temperature for 24 h, then immersing the gel B in anhydrous ethanol at room temperature, and continuing aging for 48 h;

step 2.4: soaking the aged gel B in an n-hexane solution containing 10% of trimethylsilane for 6 h, and performing hydrophobization treatment; and step 2.5: drying the gel B treated in the step S2.4 at 80-100° C. under normal pressure; treating the dried gel B in a muffle furnace at 450-500° C. for 4-6 h, and crushing to obtain the silicon oxide-silicon nitride composite aerogel.

4. The method for preparing the diaphragm composite material according to claim 3, wherein the silicon nitride in the step S2.2 has an average particle size of 30-50 nm.

* * * * *